United States Patent
Nadro (10) Patent No.: US 12,400,403 B2
(45) Date of Patent: *Aug. 26, 2025

(54) HETEROGENOUS GEOMETRY CACHING FOR REAL-TIME RENDERING OF IMAGES OF FLUIDS

(71) Applicant: Warner Bros. Entertainment Inc., Burbank, CA (US)

(72) Inventor: Jason Nadro, Riverside, IL (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,992

(22) Filed: Jun. 25, 2024

(65) Prior Publication Data

US 2024/0346769 A1    Oct. 17, 2024

Related U.S. Application Data

(63) Continuation of application No. 17/630,440, filed as application No. PCT/US2020/043786 on Jul. 27, 2020, now Pat. No. 12,033,282.

(Continued)

(51) Int. Cl.
*G06T 17/20* (2006.01)
*G06F 30/23* (2020.01)
(Continued)

(52) U.S. Cl.
CPC ............ *G06T 17/205* (2013.01); *G06F 30/23* (2020.01); *G06T 19/20* (2013.01);
(Continued)

(58) Field of Classification Search
None
See application file for complete search history.

(56) References Cited

U.S. PATENT DOCUMENTS

| | | |
|---|---|---|
| 6,342,883 B1 | 1/2002 | Kawaoka |
| 9,245,355 B2 | 1/2016 | Cai et al. |

(Continued)

OTHER PUBLICATIONS

International Search Report issued for International Application No. PCT/US20/43786 issued Feb. 4, 2021.

(Continued)

*Primary Examiner* — Edward Martello
(74) *Attorney, Agent, or Firm* — Bookoff McAndrews, PLLC (57) ABSTRACT

A method for simulating fluid surfaces in real-time in response to user input includes detecting interactive conditions triggering insertion of a heterogeneous mesh sequence in a 3D model sequence for rendering, fetching ones of the heterogenous mesh sequence from a computer memory, inserting the successive members in corresponding representations of the 3D model sequence in a computer memory, and rendering successive video frames from the representations of the 3D model sequence each including a successive member of the heterogenous mesh sequence. A related method for generating a compact heterogeneous mesh sequence for use in rendering corresponding frames of video includes generating a heterogenous mesh sequence modeling response of a fluid surface to physical forces, the heterogenous mesh sequence characterized by position values represented in computer memory by not less than 12 bytes for each vertex thereof, transforming the heterogenous mesh sequence into the compact heterogeneous mesh sequence, at least in part by quantizing the position values to not greater than four bytes, and storing the compact heterogeneous mesh sequence in a computer memory for use in real-time rendering.

20 Claims, 7 Drawing Sheets

Related U.S. Application Data

(60) Provisional application No. 62/879,353, filed on Jul. 26, 2019.

(51) Int. Cl.
 *G06F 113/08* (2020.01)
 *G06T 19/20* (2011.01)

(52) U.S. Cl.
 CPC ...... *G06F 2113/08* (2020.01); *G06T 2210/12* (2013.01); *G06T 2219/2016* (2013.01)

(56) References Cited

U.S. PATENT DOCUMENTS

| | | |
|---|---|---|
| 9,811,941 B1 | 11/2017 | Hankins et al. |
| 2004/0181382 A1 | 9/2004 | Hu et al. |
| 2006/0087509 A1 | 4/2006 | Erbert et al. |
| 2010/0164974 A1 | 7/2010 | Fairclough |
| 2012/0106858 A1 | 5/2012 | Cai et al. |
| 2012/0313927 A1 | 12/2012 | Curington et al. |
| 2013/0103365 A1 | 4/2013 | Cai et al. |
| 2015/0109291 A1 | 4/2015 | Comair et al. |
| 2019/0156112 A1* | 5/2019 | Shaburov ................. H04N 7/15 |
| 2019/0362035 A1 | 11/2019 | Jeschke et al. |

OTHER PUBLICATIONS

Meng, Yang et al., "GPU Methods for Real-Time Haptic Interaction with 3D Fluids," 2009 IEEE International Workshop on Haptic Audio Visual Environments and Games, Lecco, Italy, Nov. 2009, p. 3.

\* cited by examiner

HETEROGENOUS GEOMETRY CACHING FOR REAL-TIME RENDERING OF IMAGES OF FLUIDS

CROSS-REFERENCE TO RELATED APPLICATIONS

The present application is a continuation of, and claims the benefit of priority to U.S. patent application Ser. No. 17/630,440, filed Feb. 8, 2022, which is a National Stage Entry of International Patent Application Serial No. PCT/US20/43786, filed Jul. 27, 2020, which claims priority to U.S. Provisional Application Ser. No. 62/879,353 filed Jul. 26, 2019, which are incorporated herein by reference in their entireties.

FIELD

The present application relates to computer graphics, such as systems, apparatus and methods for simulating fluids for real-time interactive video.

BACKGROUND

Interactive video, for example as used in computer video games, places high demands on computer processing when used to simulate three-dimensional fluids responding to physical forces in real-time environments. For a satisfactory user experience of interactive video responsive to user input, each key frame of video should be rendered quickly enough such that the lag between user input and the video response to the input is not noticeable during use. While the ability to perceive time lag varies between users, most users will not perceive a lag of less than about 1/24 of a second (about 42 milliseconds). As used herein, "real-time" means no unnecessary delay intervenes between the input and output of a computational process. For real-time interactive video, a real-time lag of less than about 100 milliseconds, or more preferably, less than about 40 milliseconds, is desirable.

Achieving a desirable level of real-time lag when doing realistic simulations of fluid models for interactive video involves many design challenges. Those of skill in the art design for feasible computational power levels and seek to balance realism and complexity to deliver a user experience as good as or better than competing products. Designers must adapt to available computational power or memory resources, while users often prefer more complex models and simulations, if given a choice between products simulating physical interactions at similar speeds. Thus, interactive video designers are continually motivated to invent faster and more resource-efficient physical simulation techniques for 3D models.

Real-time fluid simulation by physical modeling is not currently feasible on consumer client devices for interactive video. Methods for approximating fluid simulation on consumer-level machines include use of traditional sprite-based visual effects or mesh particles. These solutions have various advantages and disadvantages, but neither can produce realistic, credible simulations of complex fluid effects, for example, splashing and splattering.

It would be desirable, therefore, to develop new methods and algorithms for simulating the reaction of fluids and similar materials to physical forces for real-time interactive video, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method for simulating fluid surfaces in real-time in response to user input may include detecting, by one or more processors, interactive conditions triggering insertion of a heterogeneous mesh sequence in a three-dimensional (3D) model sequence for rendering corresponding frames of video. The method may further include fetching, by the one or more processors, successive members of the heterogenous mesh sequence from a computer memory. The method may further include inserting, by the one or more processors, the successive members in corresponding representations of the 3D model sequence in a computer memory. The method may further include rendering, by the one or more processors, successive video frames from the representations of the 3D model sequence each including a successive member of the heterogeneous mesh sequence.

In related aspects of the method, the heterogenous mesh sequence may be characterized by a 1-byte grayscale value for each mesh vertex color and is free of any UV or mesh tangent data. The mesh sequence may be prepared in advance of the real-time application, as part of a production process described herein. The heterogenous mesh sequence may be characterized by quantized position values for each mesh vertex, e.g., four-byte values, quantized to meet real-time constraints without noticeable degradation of mesh geometries. In another aspect, the heterogenous mesh sequence may be characterized by a maximum bounding box and the four-byte (or other sized) position values are normalized based on the maximum bounding box. The method may further include scaling each of the four-byte position values based on a characteristic dimension of the bounding box. For example, the characteristic dimension may be an edge length of a cubic maximum bounding box, and average edge length of a rectangular solid bounding box, or a radius of a bounding sphere.

A production process may be used to prepare a suitable heterogenous mesh sequence in advance of real-time application. Accordingly, a distinct computer-implemented method for generating a compact heterogeneous mesh sequence for use in rendering corresponding frames of video may include generating, by one or more processors executing a physics simulation engine, a heterogenous mesh sequence modeling response of a fluid surface to physical forces, the heterogenous mesh sequence characterized by position values represented in computer memory by not less than 12 bytes for each vertex thereof. The method may further include transforming, by the one or more processors, the heterogenous mesh sequence into the compact heterogeneous mesh sequence, at least in part by quantizing (e.g., truncating) the position values to meet real-time constraints without noticeable degradation of mesh geometries, for example, quantized to not greater than four bytes. The method may further include storing the compact heterogeneous mesh sequence in a computer memory for use in real-time rendering In other aspects of the production method the transforming may further include removing UV or mesh tangent data from the heterogenous mesh sequence and adding a 1-byte grayscale value for each mesh vertex color. The method may further include, by the one or more processors, determining a maximum bounding box for the compact heterogeneous mesh sequence. The bounding box may be any defined volume enclosing members of the heterogeneous mesh sequence, for example a cube or other regular volumetric polygon, a sphere, ellipsoid, or other defined closed surface enclosing a volume. The method may further include, by the one or more processors, normalizing the four-byte position values based on a characteristic dimension of the bounding box, resulting in normalized four-byte position values. The characteristic dimension may be, or may be derived from, for example, an edge length of the maximum bounding box or a radius of a bounding sphere. In an aspect, the method produces the compact heterogeneous mesh sequence with mesh vertices characterized by the normalized position values, which may be four-byte or other quantized values.

As used herein, a "client device" or a "server" each include at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor. A client device or server may be generally referred to herein as an apparatus. An apparatus may include a memory holding program instructions, that when executed by the processor causes the apparatus to perform operations of the methods herein described.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The new methods meet performance and quality targets for real-time and production systems by applying several new operational features described herein below.

Figure 1:
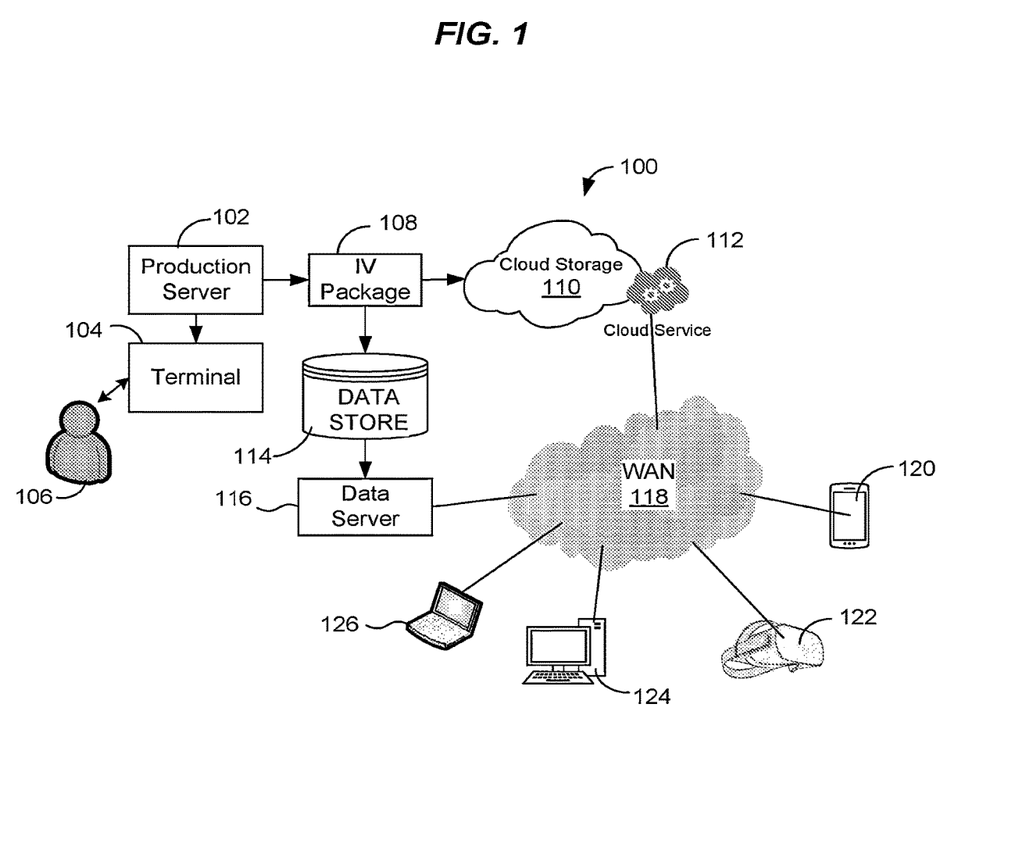
FIG. 1 is a schematic diagram illustrating a system including computing apparatus configured for performing methods as described herein for simulating fluid surfaces in real-time in response to user input and supporting production operations.

FIG. 1 shows a system 100 using methods and computing apparatus as described herein for simulating fluid surfaces in real-time in response to user input and related production operations. A production server 102 may be operated via one or more terminals 104 in use by users 106 engaged in producing interactive video content 108. The production process may include operations as described herein for generating a heterogenous mesh sequence simulating complex fluid motion and preparing the sequence data for real-time rendering in an interactive video application, e.g., a video game. Once ready for distribution, an interactive video content package may be provided to a cloud storage 110 for distribution by a cloud service 112 to any suitable client device, either by digital download or by streaming. The content 108 may, in an alternative or in addition, be distributed via a data store 114 and discrete data server 116, by distributing physical media such as memory sticks or optical discs, or by any other suitable method. Receiving client devices may include, for example, smart phones 120 and similar tablets, immersive virtual reality visors 122, desktop computers 124, laptop computers 126 or specialized gaming consoles (not shown). Each of the clients includes a processor coupled to a memory for holding executable instructions and data, and to an audio-video output device or devices.

Each computing apparatus such as the production server 102 or clients 120-124 may include a random-access memory (RAM) holding program instructions and data for rapid execution or processing by the processor for performance of methods as described herein. When the apparatus 102, 120-124 is powered off or in an inactive state, program instructions and data may be stored in a long-term memory, for example, a non-volatile magnetic, optical, or electronic memory storage device. Either or both of the RAM or the storage device may comprise a non-transitory computer-readable medium holding program instructions, that when executed by the processor of the computer, cause the apparatus to perform a method or operations as described herein. Program instructions may be written in any suitable high-level language, for example, C, C++, C#, or JavaScript™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

Further aspects and details of the methods are described in the Appendix of U.S. provisional application Ser. No. 16/879,353, which is incorporated herein by reference.

Figure 2:
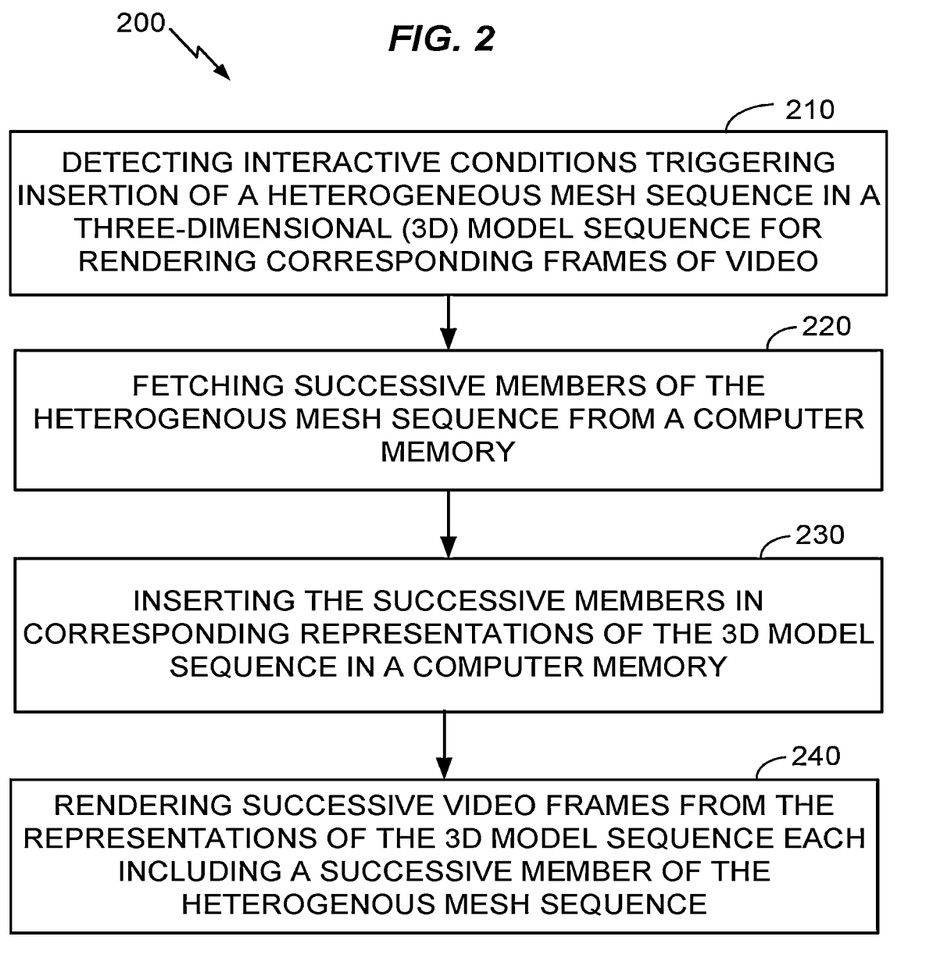
FIGS. 2-3 are flow charts illustrating a method for simulating fluid surfaces in real-time in response to user input, and optional aspects thereof.

In accordance with the foregoing, and by way of additional example, FIG. 2 shows more general aspects of a method 200 for simulating fluid surfaces in real-time in response to user input, as may be performed by a client device as described herein for real-time rendering. It should be appreciated that the more general operations of method 200 may include or embody more detailed aspects of corresponding methods described herein above.

Referring to FIG. 2, a computer-implemented method 200 for simulating fluid surfaces in real-time in response to user input may include, at 210, detecting, by one or more processors, interactive conditions triggering insertion of a heterogeneous mesh sequence in a three-dimensional (3D) model sequence for rendering corresponding frames of video. For example, a processor may detect a game engine event that calls for a fluid reaction, such as blood spewing from a wound on a virtual character, slime oozing or ejecting from a strike to an alien object, or other game action computed by the game engine in response to user action and prior game states of avatars, non-player characters and objects.

The method 200 may further include, at 220, fetching, by the one or more processors, successive members of the heterogenous mesh sequence from a computer memory. In an aspect, the heterogenous mesh sequence is selected from a library of heterogenous mesh sequences using a selection algorithm that may be random, deterministic, or driven by artificial intelligence (e.g., a neural network) to select a sequence predicted to be pleasing to the end user for the detected game event. The selected heterogenous mesh sequence may be quantized and compacted as described herein. In an alternative, the one or more processors may select a complex homogenous mesh sequence that is similarly quantized and compacted for fast real-time rendering.

The method 200 may further include, at 230, inserting, by the one or more processors, the successive members in corresponding representations of the 3D model sequence in a computer memory. For example, a processor may insert successive meshes in the sequence in corresponding successive modeled scenes, each of which will be rendered in turn to produce a key frame of the real-time interactive video. The method 200 may further include, at 240, rendering, by the one or more processors, successive video frames from the representations of the 3D model sequence each including a successive member of the heterogenous mesh sequence. Advantageously, each member of the heterogenous mesh sequence closely resembles a physically modeled fluid object and can be rendered using any suitable rendering algorithm for real-time, realistic rendering of three-dimensional (3D) object models.

The method 200 may include any one or more additional operations 300 as described above and below in FIG. 3 herein. Each of these additional operations is not necessarily performed in every embodiment of the method, and the presence of any one of the operations does not necessarily require that any other of these additional operations also be performed. For example, optionally, method 200 may further include, at 310, fetching, by the one or more processors, the heterogenous mesh sequence wherein members thereof are characterized by a compact (e.g 1-byte grayscale value) for each mesh vertex color and are free of any UV or mesh tangent data. These qualities may be configured to preserve computational and memory resources for rendering complex objects without noticeably reducing the realism of the render sequence for the fluid objects.

Figure 3:
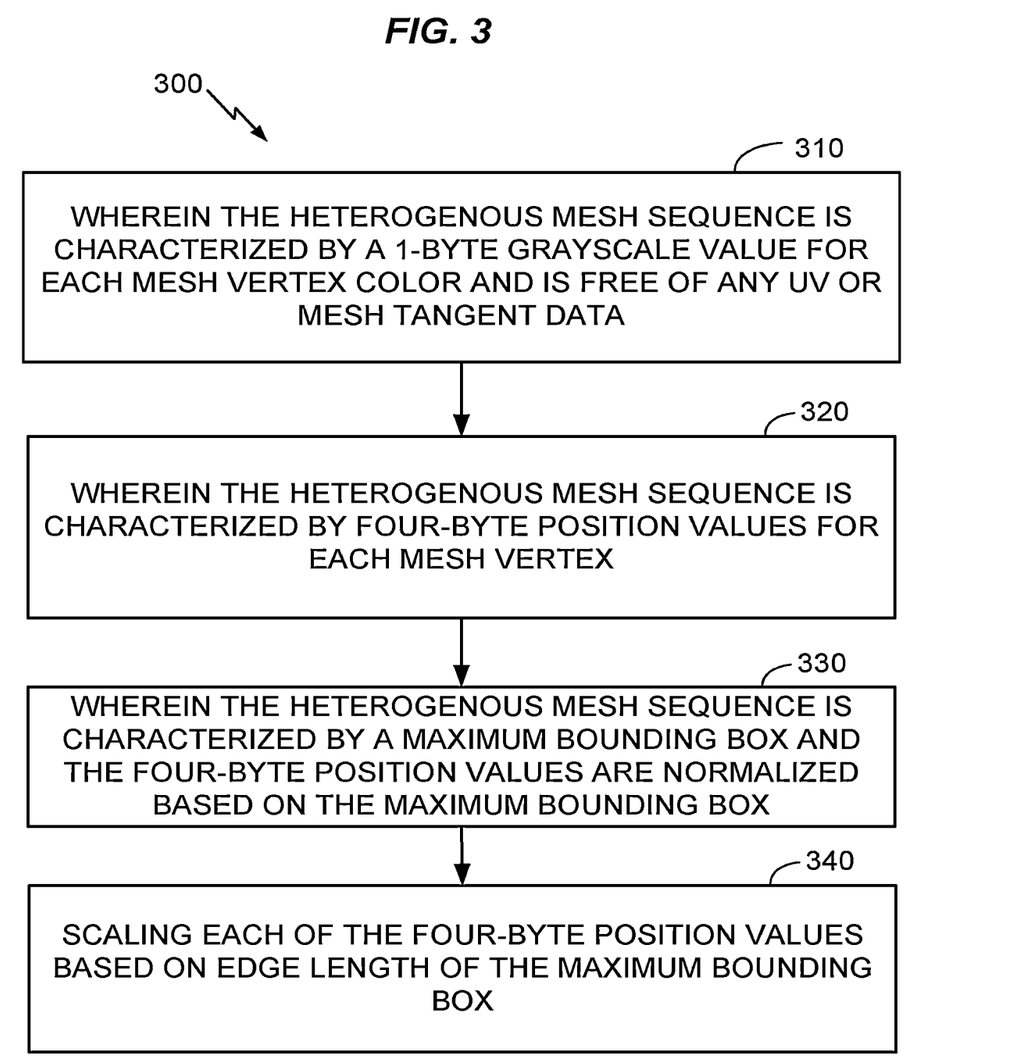

In a related aspect, the method 200 may further include the fetching, at 320, by the one or more processors, the heterogenous mesh sequence characterized by quantized position values, wherein the level of quantization preserves real-time processing and memory resources without degrading realism. For example, the vertex positions of each member of the heterogenous mesh sequence may be four-byte position values for each mesh vertex. The method 200 may further include, at 330, the fetching the heterogenous mesh sequence is characterized by a maximum bounding box wherein the quantized (e.g. four-byte) position values are normalized based on a characteristic dimension of the maximum bounding box. As noted above, the bounding box may be any defined closed volumetric surface enclosing members of the heterogeneous mesh sequence, for example a cube or other regular volumetric polygon, a sphere, ellipsoid, or other defined closed surface enclosing a volume. A characteristic dimension may be a geometric measure of the volume (e.g., an edge length, radius, or diameter), or an aggregate of its geometric measures (e.g., an average, median, or sum). In a related aspect, the method 200 may include, at 340, scaling each of the quantized (e.g., four-byte) position values based on the characteristic dimension (e.g., edge length) of the maximum bounding box for the subject mesh sequence. While the method 200 is useful for heterogeneous mesh sequences, it may also be used with homogenous or random mesh sequences.

Figure 4:
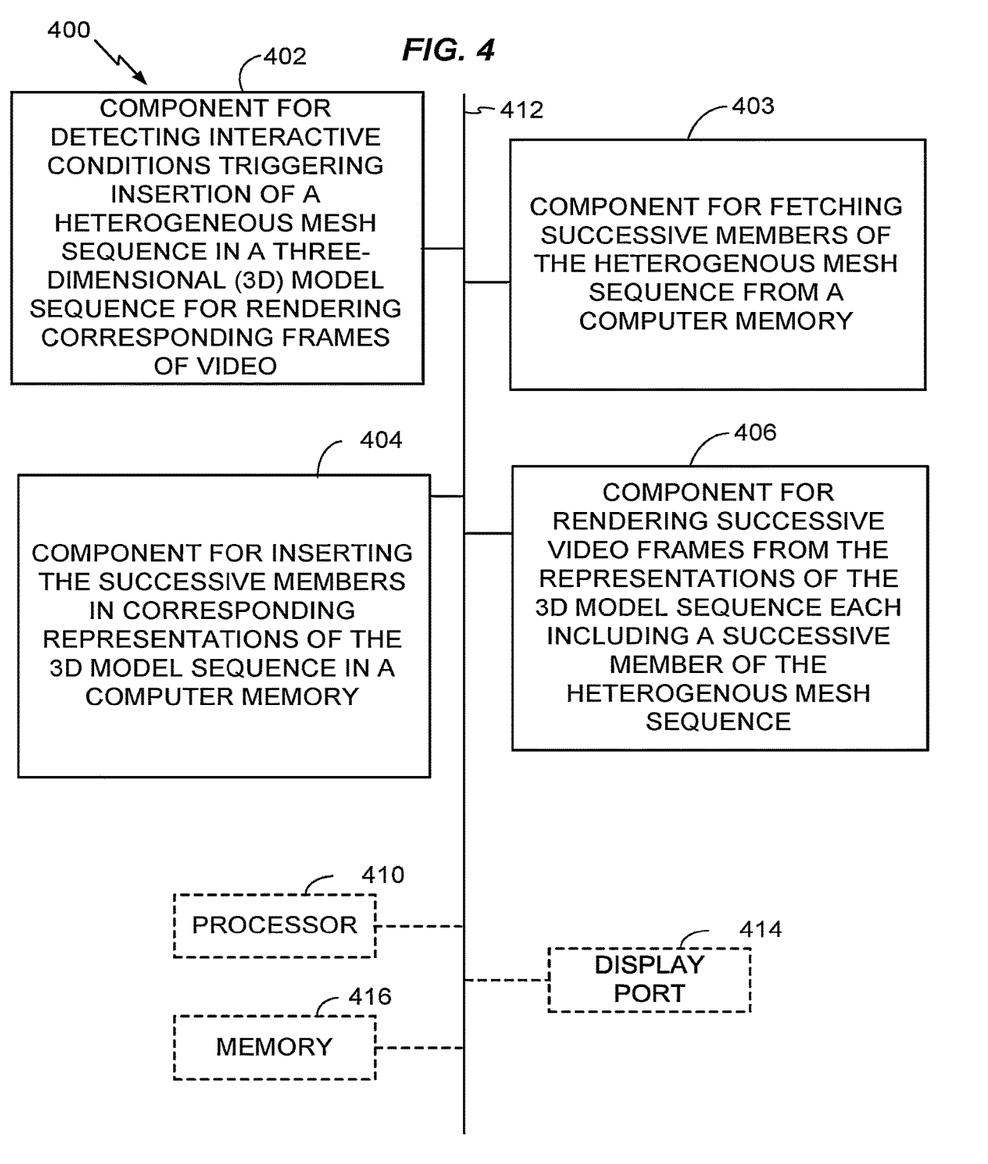
FIG. 4 is a conceptual block diagram illustrating components of an apparatus or system for simulating fluid surfaces in real-time in response to user input.

FIG. 4 is a conceptual block diagram illustrating components of an apparatus or system 400 for simulating complex fluid surfaces in real-time interactive video as described herein, according to one embodiment. As depicted, the apparatus or system 400 may include functional blocks that can represent functions implemented by a processor, software, or combination thereof (e.g., firmware).

As illustrated in FIG. 4, the apparatus or system 400 may include an electrical component 402 for detecting interactive conditions triggering insertion of a heterogeneous mesh sequence in a three-dimensional (3D) model sequence for rendering corresponding frames of video. The component 402 may be, or may include, a means for said detecting. Said means may include the processor 410 coupled to the memory 416, and to the display port 414, the processor executing an algorithm based on program instructions stored in the memory. Such algorithm may include a sequence of more detailed operations, receiving an interrupt signal from an interactive (e.g., game) engine, and determining whether a sequence identifier for a heterogeneous mesh sequence is called for by or associated with the interrupt signal. Optionally, the one or more processors may determine whether an associated or identified sequence identifier is valid, and call an error handling routine if the sequence is invalid.

The apparatus or system 400 may further comprise an electrical component 403 for fetching successive members of the heterogenous mesh sequence from a computer memory. The component 404 may be, or may include, a means for said fetching. Said means may include the processor 410 coupled to the memory 416, and to the display port 414, the processor executing an algorithm based on program instructions stored in the memory. Such algorithm may include a sequence of more detailed operations, for example, generating a query to a library module based on a sequence identifier, receiving access to an identified model sequence, and loading members of the sequence into a cache memory.

The apparatus or system 400 may further comprise an electrical component 404 for inserting the successive members of the mesh sequence in corresponding representations of the 3D model sequence in a computer memory. The component 404 may be, or may include, a means for said inserting. Said means may include the processor 410 coupled to the memory 416, and to the display port 414, the processor executing an algorithm based on program instructions stored in the memory. Such algorithm may include a sequence of more detailed operations, for example, correlating successive members of the mesh sequence to a sequence of 3D models for generating successive key frames of interactive video, and placing mesh and rendering data for each successive member of the mesh sequence in a scene data structure (e.g., list) for corresponding successive ones of the 3D models.

The apparatus or system 400 may further comprise an electrical component 406 for rendering successive video frames from the representations of the 3D model sequence each including a successive member of the heterogeneous mesh sequence. The component 406 may be, or may include, a means for said rendering. Said means may include the processor 406 coupled to the memory 416, and to the display port 414, the processor executing an algorithm based on program instructions stored in the memory. Such algorithm may include a sequence of more detailed operations, for example, applying physical or physical-simulating rendering algorithm to the successive ones of the 3D models each with an inserted one of the mesh sequence, and saving the rendered pixels in an image format for a corresponding successive key frame for generating output video.

The apparatus 400 may optionally include a processor module 410 having at least one processor, in the case of the apparatus 400 configured as a graphics processor, or a combination of graphics processors and at least one general computational processor of a CPU. The processor 410, in such case, may be in operative communication with the modules 402-406 via a bus 412 or other communication coupling, for example, a network. The processor 410 may initiate and schedule the processes or functions performed by electrical components 402-406.

In related aspects, the apparatus 400 may include a display port 414 operable for providing a video signal to a display device. In further related aspects, the apparatus 400 may include a module for storing information, such as, for example, a memory device/module 416. The computer readable medium or the memory module 416 may be operatively coupled to the other components of the apparatus 400 via the bus 412 or the like. The memory module 416 may be adapted to store computer readable instructions and data for effecting the processes and behavior of the modules 402-406, and subcomponents thereof, or the processor 410, or the method 200 and one or more of the additional operations 300 described in connection with the method 200. The memory module 416 may retain instructions for executing functions associated with the modules 402-406. While shown as being external to the memory 416, it is to be understood that the modules 402-406 can exist within the memory 416.

In accordance with the foregoing, and by way of additional example, FIG. 12 shows aspects of a method 1200, as may be performed by a production server as described herein. It should be appreciated that the method 1200 may include or embody more detailed aspects of corresponding methods described herein above.

Figure 5:
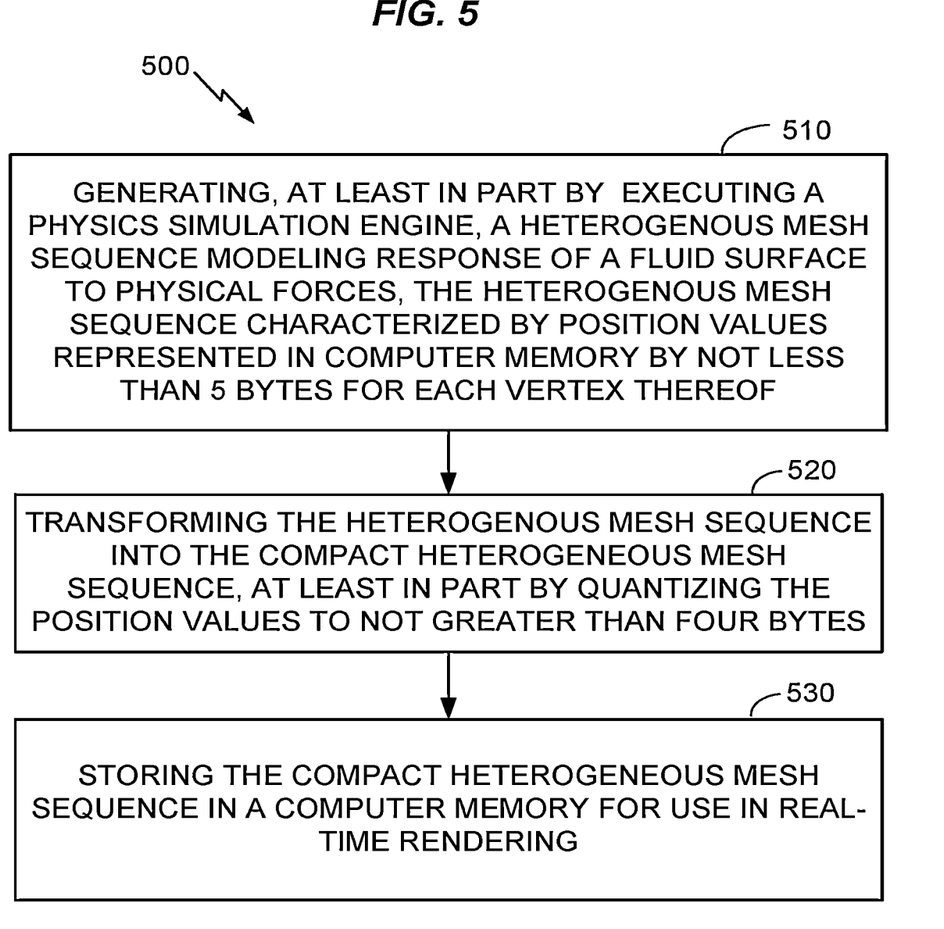
FIGS. 5-6 are flow charts illustrating a method for generating a compact heterogeneous mesh sequence for use in rendering corresponding frames of video, and optional aspects thereof.

Referring to FIG. 5, a computer-implemented method 500 for generating a compact heterogeneous mesh sequence for use in rendering corresponding frames of video may include, at 510, generating, by one or more processors executing a physics simulation engine, a heterogenous mesh sequence modeling response of a fluid surface to physical forces, the heterogenous mesh sequence characterized by position values represented in computer memory by not less than 12 bytes for each vertex thereof. The method 500 may further include, at 520, transforming, by the one or more processors, the heterogenous mesh sequence into the compact heterogeneous mesh sequence, at least in part by quantizing the position values, for example, to a value not greater than four bytes. The method 500 may further include, at 530, storing the compact heterogeneous mesh sequence in a computer memory for use in real-time rendering.

Figure 6:
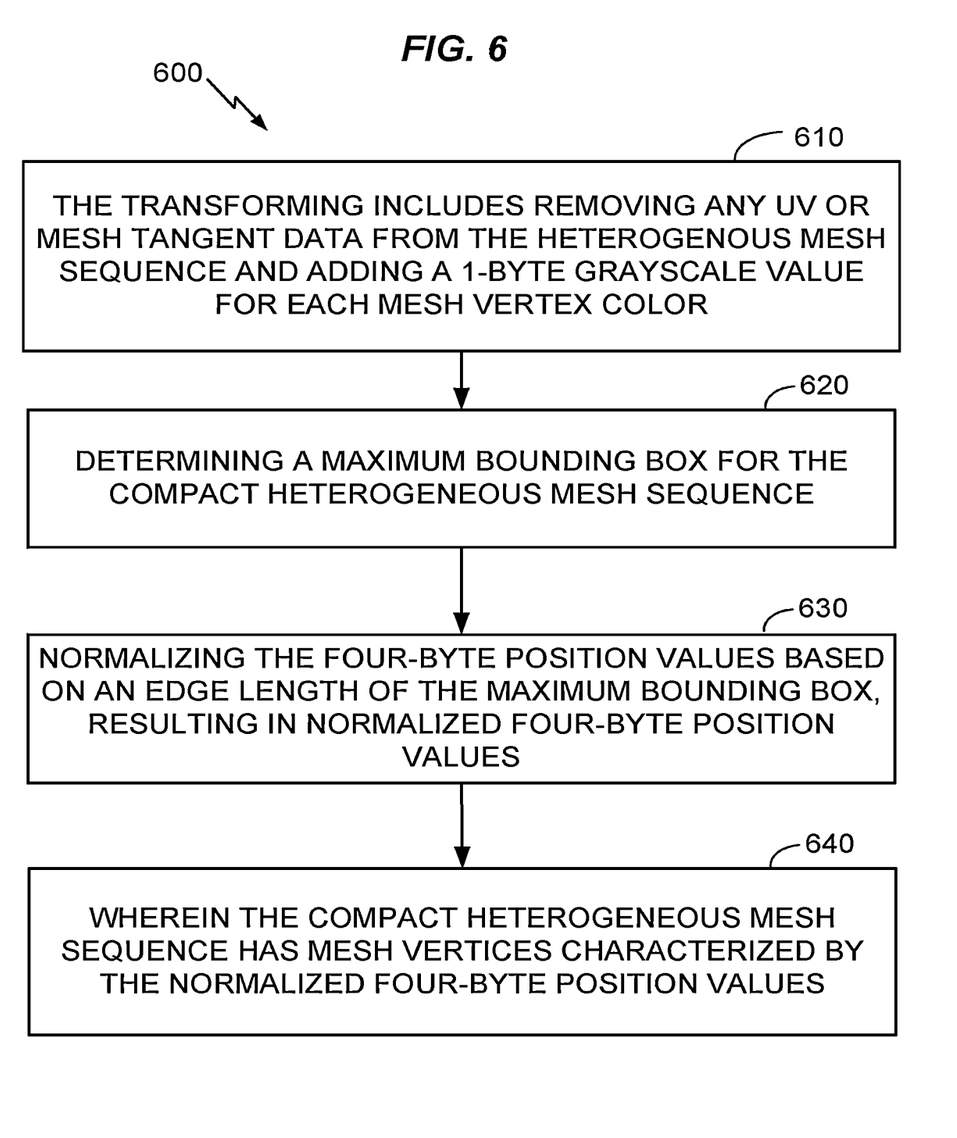

The method 500 may include any one or more additional operations 600 in connection with FIG. 6. Each of these additional operations 600 is not necessarily performed in every embodiment of the method, and the presence of any one of the operations does not necessarily require that any other of these additional operations also be performed.

Referring to FIG. 6, the transforming operation of method 500 may further include, at 610, removing any UV or mesh tangent data from the heterogenous mesh sequence. Optionally, the method may further include adding a compact (e.g., 1-byte) color (e.g., grayscale) value for each mesh vertex color.

The method 500 may further include, at 620, the one or more processors determining a maximum bounding box for the compact heterogeneous mesh sequence. The description of a bounding box as noted above applies to this operation 620. The method 500 may further include, at 630, the one or more processors normalizing the quantized (e.g., four-byte) position values based on a characteristic dimension (e.g., edge length) of the maximum bounding box, resulting in normalized quantized (e.g., four-byte) position values. The description of a characteristic dimension as noted herein above applies to this operation 630. The method 500 may further include, at 630, the one or more processors configuring the compact heterogeneous mesh sequence with mesh vertices characterized by the normalized (e.g., four-byte) position values.

Figure 7:
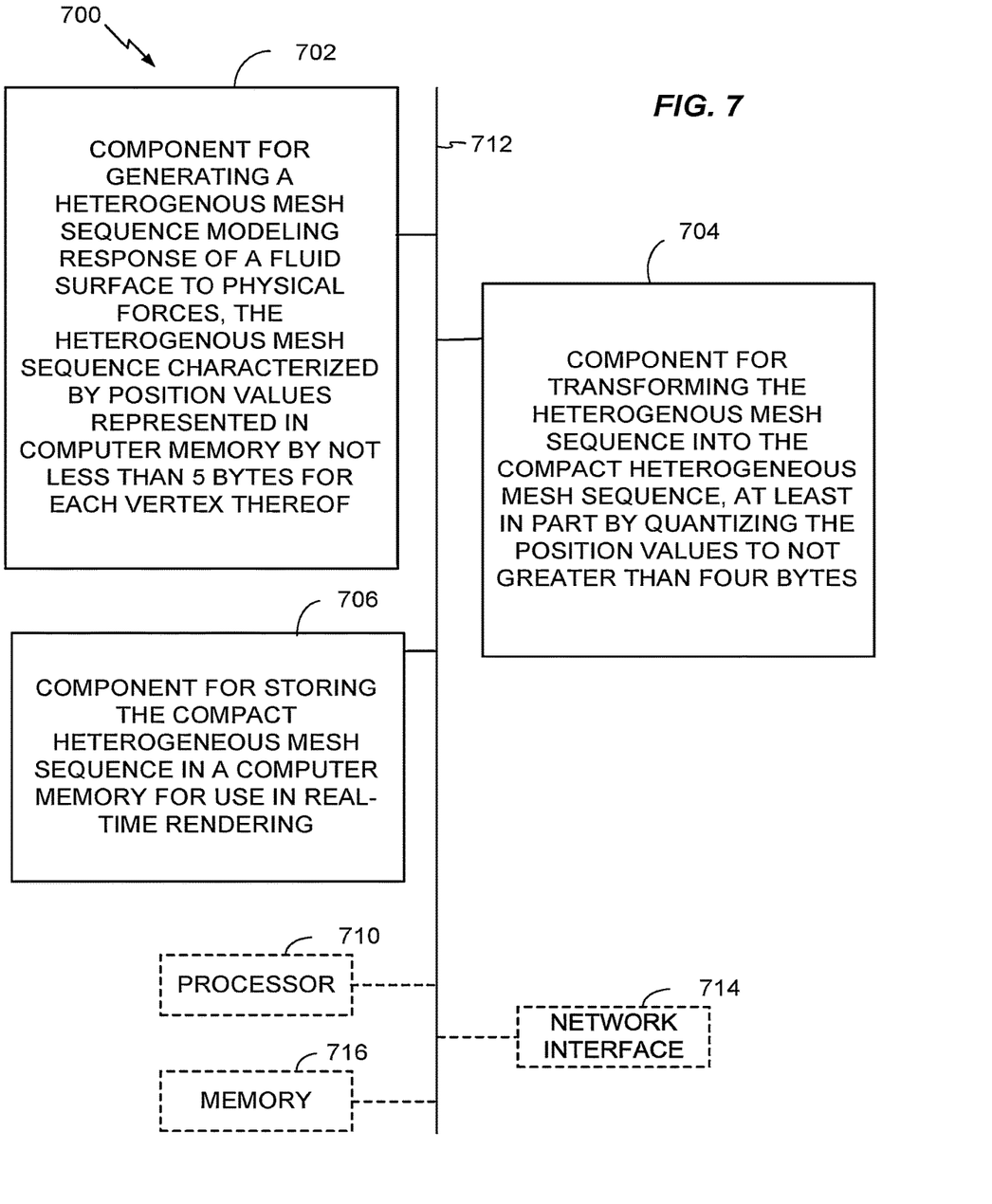
FIG. 7 is a conceptual block diagram illustrating components of an apparatus or system for generating a compact heterogeneous mesh sequence for use in rendering corresponding frames of video.

FIG. 7 is a conceptual block diagram illustrating components of an apparatus or system 700 for generating a compact heterogeneous mesh sequence for use in rendering corresponding frames of video. As depicted, the apparatus or system 700 may include functional blocks that can represent functions implemented by a processor, software, or combination thereof (e.g., firmware).

As illustrated in FIG. 7, the apparatus or system 700 may comprise an electrical component 702 for generating, by executing a physics simulation engine, a heterogenous mesh sequence modeling response of a fluid surface to physical forces, the heterogenous mesh sequence characterized by position values represented in computer memory by not less than 12 bytes for each vertex thereof. The component 702 may be, or may include, a means for said generating. Said means may include the processor 710 coupled to the memory 716, the processor executing an algorithm based on program instructions stored in the memory. Such algorithm may include a sequence of more detailed operations, for example, providing an initial fluid mesh with fluid and external force parameters to a physics modeling engine (e.g., Houdini™), receiving a chronological mesh sequence from the physics modeling engine, converting the sequence to a defined format (e.g., Alembic™, and saving the converted sequence to a memory.

The apparatus or system 700 may further comprise an electrical component 704 for transforming the heterogenous mesh sequence into the compact heterogeneous mesh sequence, at least in part by quantizing the position values to not greater than four bytes. The component 704 may be, or may include, a means for said quantizing. Said means may include the processor 704 coupled to the memory 716, the processor executing an algorithm based on program instructions stored in the memory. Such algorithm may include a sequence of more detailed operations, for example, reading a matrix of position values for each mesh in the sequence, and truncating the least significant bits of each position value in each matrix representing a mesh. It may further include other operation described in connection with FIG. 6.

The apparatus or system 700 may further comprise an electrical component 706 for storing the compact heterogeneous mesh sequence in a computer memory for use in real-time rendering. The component 700 may be, or may include, a means for said storing. Said means may include the processor 700 coupled to the memory 716, the processor executing an algorithm based on program instructions stored in the memory. Such algorithm may include a sequence of more detailed operations, for example, encoding the mesh sequence and associated data by a pre-determined protocol, and sending the encoded sequence to a memory module.

The apparatus 700 may optionally include a processor module 710 having at least one processor, in the case of the apparatus 700 configured as a data processor. The processor 710, in such case, may be in operative communication with the modules 702-706 via a bus 712 or other communication coupling, for example, a network. The processor 710 may initiate and schedule the processes or functions performed by electrical components 702-706.

In related aspects, the apparatus 700 may include a network interface module 716 operable for communicating with a storage device over a computer network. In further related aspects, the apparatus 700 may include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 710, or the method 500 and one or more of the additional operations 600 described in connection with the method 500. The memory module 716 may retain instructions for executing functions associated with the modules 702-706. While shown as being external to the memory 716, it is to be understood that the modules 702-706 can exist within the memory 716.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for rendering images of object or fluid surfaces in response to user input, the computer-implemented method comprising:
    detecting, by one or more processors, a game engine event corresponding to a fluid reaction to be rendered in one or more frames of an interactive multimedia session involving user input;
    utilizing, by the one or more processors via a neural network, a selection algorithm to determine a heterogenous mesh sequence for the game engine event corresponding to the fluid reaction;
    retrieving, by the one or more processors, the heterogenous mesh sequence and one or more successive members of the heterogenous mesh sequence from a database;
    inserting, by the one or more processors, the heterogenous mesh sequence in a multi-dimensional model sequence corresponding to the game engine event;
    inserting, by the one or more processors, the one or more successive members in one or more corresponding representations of the multi-dimensional model sequence; and
    rendering, by the one or more processors, the one or more representations of the multi-dimensional model sequence within the interactive multimedia session.

2. The computer-implemented method of claim 1, wherein the game engine event is responsive to a user action.

3. The computer-implemented method of claim 1, wherein the one or more successive members includes a physically modeled fluid object.

4. The computer-implemented method of claim 1, wherein the heterogenous mesh sequence includes a sequence identifier.

5. The computer-implemented method of claim 4, the computer-implemented method further comprising:
    determining, by the one or more processors, whether the sequence identifier is valid; and
    in response to determining that the sequence identifier is not valid, calling, by the one or more processors, an error handling routine.

6. The computer-implemented method of claim 1, wherein rendering the one or more representations of the multi-dimensional model sequence comprises:
    executing, by the one or more processors, a physical rendering algorithm to the one or more successive members; and
    storing, by the one or more processors, one or more rendered pixels in an image format for a successive key frame for generating output video.

7. The computer-implemented method of claim 1, the computer-implemented method further comprising:
    transforming, by the one or more processors, the heterogenous mesh sequence into a compact heterogeneous mesh sequence by quantizing one or more position values; and
    storing, by the one or more processors, the compact heterogenous mesh sequence in a rendering database.

8. A computer system for rendering images of object or fluid surfaces in response to user input, the computer system comprising:
    a memory having processor-readable instructions stored therein; and
    one or more processors configured to access the memory and execute the processor-readable instructions, which when executed by the one or more processors configures the one or more processors to perform a plurality of functions, including functions for:
        detecting, by one or more processors, a game engine event corresponding to a fluid reaction to be rendered in one or more frames of an interactive multimedia session involving user input;
        utilizing, by the one or more processors via a neural network, a selection algorithm to determine a heterogenous mesh sequence for the game engine event corresponding to the fluid reaction;
        retrieving, by the one or more processors, the heterogenous mesh sequence and one or more successive members of the heterogenous mesh sequence from a database;
        inserting, by the one or more processors, the heterogenous mesh sequence in a multi-dimensional model sequence corresponding to the game engine event;
        inserting, by the one or more processors, the one or more successive members in one or more corresponding representations of the multi-dimensional model sequence; and
        rendering, by the one or more processors, the one or more representations of the multi-dimensional model sequence within the interactive multimedia session.

9. The computer system of claim 8, wherein the game engine event is responsive to a user action.

10. The computer system of claim 8, wherein the one or more successive members includes a physically modeled fluid object.

11. The computer system of claim 8, wherein the heterogenous mesh sequence includes a sequence identifier.

12. The computer system of claim 11, the functions further comprising:
    determining, by the one or more processors, whether the sequence identifier is valid; and in response to determining that the sequence identifier is not valid, calling, by the one or more processors, an error handling routine.

13. The computer system of claim 8, wherein rendering the one or more representations of the multi-dimensional model sequence comprises:
- executing, by the one or more processors, a physical rendering algorithm to the one or more successive members; and
- storing, by the one or more processors, one or more rendered pixels in an image format for a successive key frame for generating output video.

14. The computer system of claim 8, the functions further comprising:
- transforming, by the one or more processors, the heterogenous mesh sequence into a compact heterogeneous mesh sequence by quantizing one or more position values; and
- storing, by the one or more processors, the compact heterogenous mesh sequence in a rendering database.

15. A non-transitory computer-readable medium containing instructions for rendering images of object or fluid surfaces in in response to user input, the instructions comprising:
- detecting a game engine event corresponding to a fluid reaction to be rendered in one or more frames of an interactive multimedia session involving user input;
- utilizing, via a neural network, a selection algorithm to determine a heterogenous mesh sequence for the game engine event corresponding to the fluid reaction;
- retrieving the heterogenous mesh sequence and one or more successive members of the heterogenous mesh sequence from a database;
- inserting the heterogenous mesh sequence in a multi-dimensional model sequence corresponding to the game engine event;
- inserting the one or more successive members in one or more corresponding representations of the multi-dimensional model sequence; and
- rendering the one or more representations of the multi-dimensional model sequence within the interactive multimedia session.

16. The non-transitory computer-readable medium of claim 15, wherein the game engine event is responsive to a user action.

17. The non-transitory computer-readable medium of claim 15, wherein the one or more successive members includes a physically modeled fluid object.

18. The non-transitory computer-readable medium of claim 15, wherein the heterogenous mesh sequence includes a sequence identifier.

19. The non-transitory computer-readable medium of claim 15, the instructions further comprising:
- determining whether the sequence identifier is valid; and
- in response to determining that the sequence identifier is not valid, calling an error handling routine.

20. The non-transitory computer-readable medium of claim 15, wherein rendering the one or more representations of the multi-dimensional model sequence comprises:
- executing a physical rendering algorithm to the one or more successive members; and
- storing one or more rendered pixels in an image format for a successive key frame for generating output video.

* * * * *

UNITED STATES PATENT AND TRADEMARK OFFICE
CERTIFICATE OF CORRECTION

| | | |
|---|---|---|
| PATENT NO. | : 12,400,403 B2 | Page 1 of 1 |
| APPLICATION NO. | : 18/752992 | |
| DATED | : August 26, 2025 | |
| INVENTOR(S) | : Jason Nadro | |

It is certified that error appears in the above-identified patent and that said Letters Patent is hereby corrected as shown below:

In the Claims

In Column 13, Line 22, Claim 15, delete "in in" and insert --in--

Signed and Sealed this
Thirtieth Day of September, 2025

John A. Squires
*Director of the United States Patent and Trademark Office*